United States Patent
Lings et al.

[15] 3,666,073
[45] May 30, 1972

[54] AIRPORT CHECK-IN COUNTER WITH BAGGAGE RECEIVING AND HANDLING FACILITY

[72] Inventors: Gerhard Lings, Leimen; Eberhard Hellermann, Morfelden, both of Germany

[73] Assignee: Mannesmann-Geisel GmbH & Co., Mannheim, Germany

[22] Filed: Feb. 19, 1971

[21] Appl. No.: 116,832

[52] U.S. Cl. ............................198/1, 198/33 AC, 198/39, 186/1 A
[51] Int. Cl. ................B65j 47/26, B65g 69/100, E04h 3/04
[58] Field of Search ............198/1, 33 AC, 19, 138, 102, 198/39; 186/1 R, 1 A, 1 AC

[56] References Cited

UNITED STATES PATENTS

| 3,010,564 | 11/1961 | Drew | 198/138 |
| 3,180,475 | 4/1965 | Del Rosso | 198/39 |
| 3,595,251 | 7/1971 | Tarantola | 198/33 AC |

Primary Examiner—Richard E. Aegerter
Attorney—Smyth, Roston & Pavitt and Rolf H. Siegemund

[57] ABSTRACT

An airport check-in counter with desk and baggage receiving and placement area containing a first conveyor belt with scale; a second belt also constructed as scale is behind the first one and feeds baggage tilting and pallet loading facilities. The baggage tilting equipment has two parallely running belts tiltable on an axis between them. The pallet loading facility has two belts on carriages, moving transverse to each other.

8 Claims, 3 Drawing Figures

Patented May 30, 1972 3,666,073

Inventors:
Gerhard Lingg
Eberhard Hellermann
By Smyth, Roston & Pavitt
Ralf H. Siegemund
ATTORNEYS

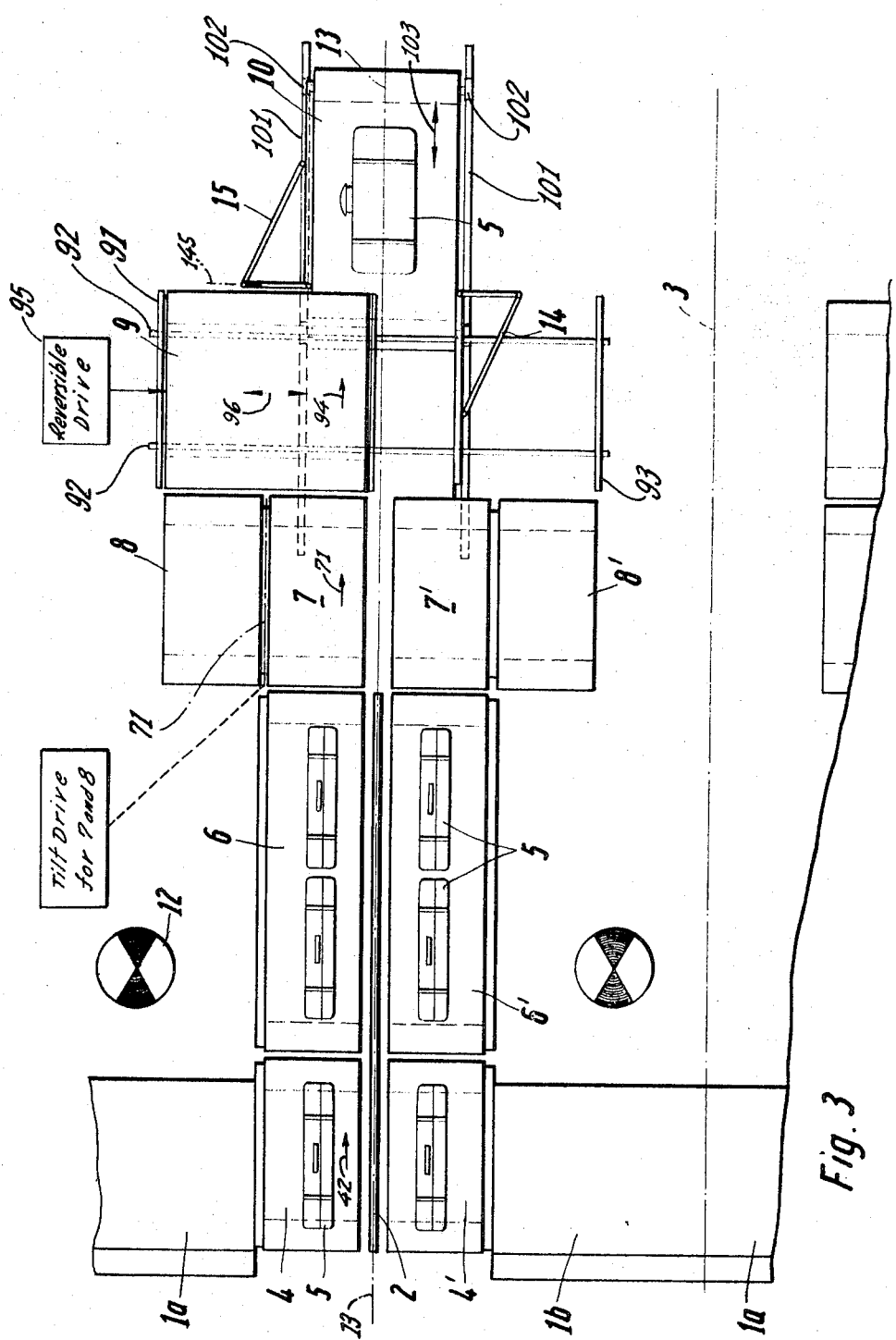

AIRPORT CHECK-IN COUNTER WITH BAGGAGE RECEIVING AND HANDLING FACILITY

The present invention relates to improvements for baggage check-in and handling facilities in airport check-in counters. These counters are usually arranged along one or several sides of the passenger departure hall in an airport.

Each airport check-in counter has a desk and a baggage receiving area right next to the desk; usually, there is a gap between two desks occupied by a scale. Each check-in counter is, thus, as long as its desk plus the space for baggage placement. In conventional type check-in facilities luggage is placed by hand on a scale in-between two counter desks, and, after weighing, a clerk or porter removes the luggage, again by hand. Usually, also there is some conveying equipment, such as conveyor belts next to or behind the desks to move the baggage, having been properly weighted, tagged etc. out of the check-in area. Usually, there is along conveyor belt, running parallel to the front of all the desks but behind them.

In most cases, baggage that has been received must be moved to a different level, i.e., the baggage can rarely be moved more or less horizontally (or with a small up or down inclination) from the check-in area to the plane loading facilities. Therefor, the baggage handling arrangement often includes elevators or pallets moving in a vertical chute or shaft. One known check-in facility is constructed to have a shaft right next to a check-in counter desk, and places a trough-shaped pallet to the disposal of the passenger immediately in front of him. The pallet then moves horizontally onto a scale, stops there, and continuous towards a second shaft, moves down etc., to the loading facilities and returns empty to the check-in counter.

Obviously, the pallet, as a container, has to be wider than any piece of luggage, and the shaft in which it moves has to be still larger. Suitable pallets have to be at least 2 feet wide, and the shaft construction is wider accordingly. Thus, the baggage placement and receiving portion of the counter occupies considerable space. However, the total length of the counter front should be as small as possible. A definite disadvantage of this type of automated baggage receiving and handling facility is the rather low speed of the pallets along the entire path of transport, as suitcases are placed in upright and should not too strongly swivel back and forth between safety yokes or the like. Also, the return shaft for the pallets is disposed right in front of the passenger placing his luggage for check-in, so that there is danger of an accident, particularly during the period when the just loaded pallet moves away (horizontally) and the next one has not yet completely come up in the shaft.

The latter danger has been avoided in a type of counter construction, with two mirror image like check-in units arranged on opposite sides of a rectangle and forming islands in pairs, accessible from all sides. Luggage is placed from the side, relative to the front line of the counters, and the two pallet shafts are covered by counter desks. Check-in speed is still quite low here as suitcases are still moved upright. Moreover, this modified counter construction occupies even more space.

It is an object of the invention to provide for check-in counter arrangement which permits automated transportation from the point where the passenger places his luggage, away from the counter, towards the plane loading facilities. The counter front is to be as short as possible, shorter than in the known arrangements. Danger of accidents must be eliminated, and the pieces of luggage should be placed into a pallet without requiring any tie down, holding yokes or the like.

In accordance with the preferred embodiment of the invention, it is suggested to provide a first conveyor belt next to the counter to be available for immediate placement of a piece of luggage by a passenger. At least one other conveyor belt is disposed behind the first one, the conveying direction being transverse to the counter front. At least one, preferably both of the belts, are constructed to serve as weighing scale. A luggage tilting assembly is disposed behind the belt and a pallet loading facility receives layed down suitcases from the tilting assembly.

It can thus be seen that the pallets are not within reach of the passengers or the clerk behind the counter, as the transport mechanism leading to the pallet loading area leads away from these people. The invention is based on the principle of particular functional separation of luggage reception area from pallet loading facilities, so as to accommodate two opposing demands made on the system: The individual passenger must be carefully and attentively serviced, and the clerk must not be rushed by the transport mechanism. However, the latter system requires high speed operation to meet the demands. The baggage check-in area, i.e., the counters, generally are quite remote from the plane loading area, so that the luggage has to traverse considerable distance, and that distance must be traversed at highest possible speed. The inventive combination fulfills these requirements without great expenditure. The system is based on the fact that the area behind the counter is a lesser valued work area of the airport than the area in front of the counter.

The baggage check-in area next to the counter is as wide as the luggage receiving conveyor belt thereat, which need not be wider than the width of a conventional, reasonably large suitcase; which is about 1½ feet. For larger or odd shaped pieces of luggage there may be a special counter, as clearly not all counters have to be equipped for rare cases. The goal is to check in a large majority of passengers at minimum delay and waiting period. The first and second conveyor belts are preferably both constructed for weighing, i.e., the respective belt serves as receiving platform of a scale each. The second belt should be as long as two regular suitcases are long when placed one behind the other. Alternatively, there may be two belts in line, each for accommodating one suitcase, so that there are three conveyor belts.

The tilting arrangement is constructed preferably from two side by side and parallel running conveyor belts, which can tilt about an axis so as to form a V-shaped trough for tipping a suitcase on the side. One of these belts is in line with the weighing belts, the other one is placed next to it. Both these belts of the tilting device are disposed in relation to still another conveyor belt, which is mounted on a laterally moving carriage and cooperating with a still further conveyor belt that loads the pallets. As the pallet loading mechanism operates at high speed, it can be shared with two baggage receiving and weighing arrangements pertaining to two different counters but loading pallets of one shaft. This is the reason for the laterally moving carriage, so that the pallet shaft receives the baggage from each of the two baggage receiving areas. Actually, the tilting device can be likewise shared.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a top elevation of the arrangement of FIGS. 1 and 2.

Figure 1:
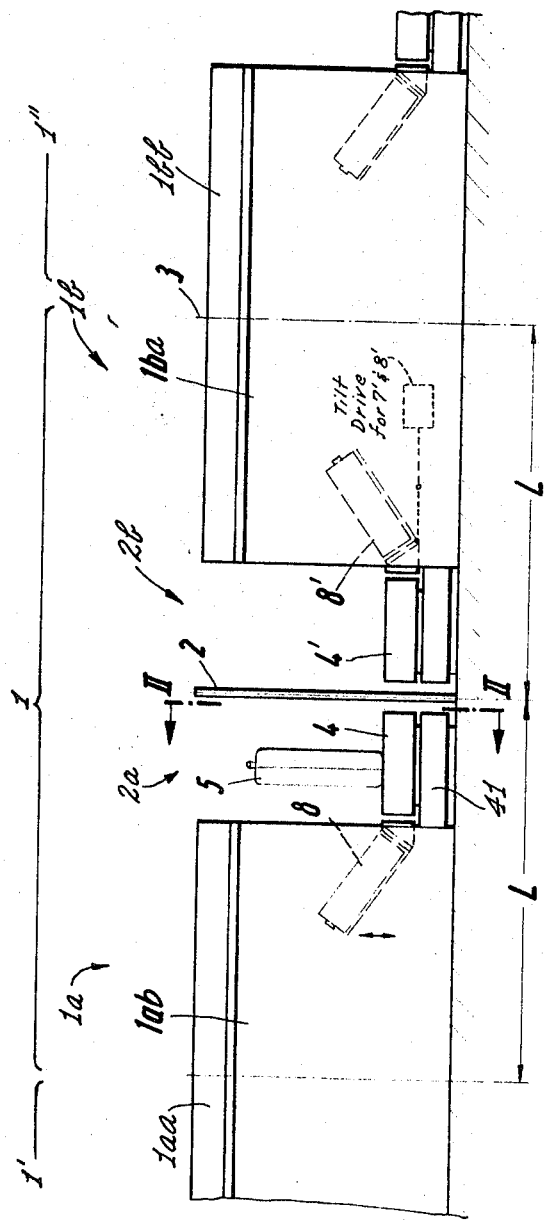
FIG. 1 illustrates somewhat schematically a front view of several check-in counters in an airport.
Figure 2:
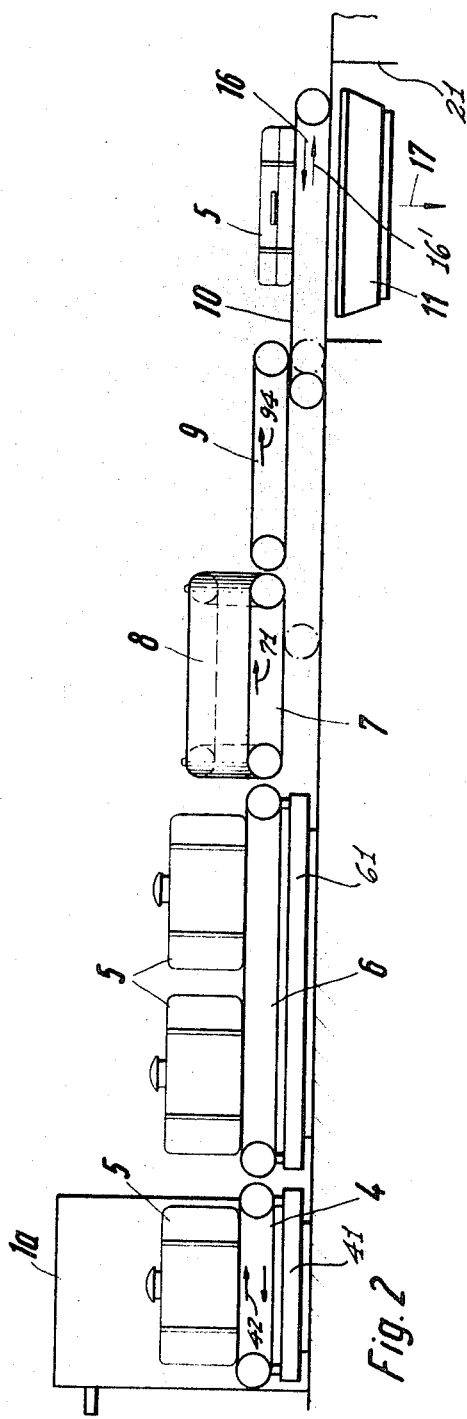
FIG. 2 is a section view taken along line 2—2 of FIG. 1.

Proceeding to the detailed description of the drawings, the Figures show somewhat schematically a double counter 1 for passenger and baggage check-in in an airport. Each double counter includes two counter desks, but each desk is one half of a double desk pertaining to two different double counters. In particular, there are shown, two double desks 1a and 1b. Double desk 1a having integral desks 1aa and 1ab, double desk 1b having integral desks 1ba and 1bb. However, desks 1ab and 1ba pertain to the double counter 1; the respective other desks, 1aa and 1bb, pertain to other double counters such as 1' and 1" etc. The dividing lines 3 may be imaginary or may identify simple demarkations on the respective double desks.

Baggage handling area is provided for the side of each counter desk, particularly, there is a placement area 2a to the right of counter desk 1ab and an area 2b to the left of counter desk 1ba, there being a divider wall or partition 2 between the two baggage handling and placement areas, 2a and 2b. Thus, the two counters of double counters 1 are constructed as mirror image of each other, with the wall 2 defining the plane of symmetry. Double counter 1 has two desks, 1ab and 1ba, and two baggage placement areas (2a, 2b) in between. A counter desk with its associated baggage placement area extends over the length L in direction of extension of the several counters and counter front. Minimum length for L should be 1,600 mm (about 5½ feet). Arrangements of that type, establishing a row of counters, are provided in suitable locations in a passenger departure hall of an airport.

A baggage placement area, as associated with a counter desk, is provided with a combined, scale-conveyor facility. There is a short conveyor belt 4 of the endless variety, moving transverse to the extension of the row of counters. The loading surface of belt 4 moves particularly in direction of arrow 42. The belt is mounted on and is part of a weighing scale 41. There is a similar belt 4' provided in baggage placement area 2b for receiving luggage of a passenger who is taken care of at desk 1ba.

Each belt has a width that spans just about the width of the respective baggage placement area and may be about 450 mm (1½ feet) wide. This width suffices to accommodate practically all kinds of luggage in upright, standing position. Wider suitcases, e.g., trunks or odd shaped baggage, are rarely used, and a special check-in counter could be provided for such cases, e.g., at the end of the row of counters. Also only one suitcase at a time (such as a suitcase 5), is placed on belt 4. Therefore, the belt has length about equal to the maximum length of conventional luggage. The invention is destined primarily to accomodate the usual and normal situation, sometimes even defined by size restrictions for luggage. The belt 4 may be partially hidden behind a front cover (not shown), having upper edge about level with the loading surface of belt 4 and provided for protection of passengers standing in front of the counter.

A second scale-conveyor facility with an endless conveyor belt 6, of about twice the length of belt 4, is disposed behind belt 4. The belt 6 is mounted on and part of a scale 61. The upwardly directed conveyor surfaces of the two belts 4 and 6, transport in the same direction, that is away from the front of the counters.

Following the two belts, 4 and 6, is a tilting or tipping device comprised of two juxtaposed, endless conveyor belts 7 and 8. These two belts can be tilted up about an axis 71, located about between the parallely moving edges of the two belts when running as conveying surfaces. Belt 7, when folded down, is aligned with belt 6 to provide conveyor continuation thereof in the horizontal (see arrow 71). Belt 8 is laterally displaced from belt 7. FIG. 1 illustrates belt 8 in an in-between position during tilting. Reference numerals 4', 6', 7', 8', denote similar parts for the other one of the double counter 1, cooperating with baggage receiving area 2b.

Another conveyor belt 9 is provided behind the tilting arrangement and has its upper surface moving in the same direction (arrow 94). Belt 9 is mounted on a carriage 91 that can ride on rods 92 (the rolls driving belt 9 are journaled in that carriage). Carriage 91 as a whole can be displaced by means of a reversible drive 95 (double arrow 96), transverse to the direction of baggage transportation as described. As can be seen, rods or rails 92 extend across both tilting devices 7, 8, and 7', 8', so as to service both of them.

The carriage 91 with belt 9 brings a tilted suitcase into alignment with a conveyor belt 10 that is aligned (axis 13) with the divider 2. Conveyor belt 10 is mounted likewise on a carriage 102 which runs on rails 101. The carriage 102 is movable in the direction (or oppositely thereto) of conveyor belt system advance (see double arrow 103 on belt 10 in FIG. 3). However, belt 10 is disposed to have its conveyor plane sufficiently below belt 9, so that belt 10 with its carriage can telescopically slide under belt carriage 91.

Belts 9 and 10 constitute the loading equipment for pallets such as pallet 11. These pallets pertain to a high speed vertical conveyor system and are lowered in a shaft 21 after loading, to a conveyor system at a lower level leading to aircraft loading facilities. In the protracted position, belt 10 covers shaft 21 and pallet 11; upon retraction under carriage 91, luggage on belt 10 drops in the pallet underneath.

The baggage check-in system works as follows. Reference numeral 12 denotes symbolically the respective clerks behind the check-in counter desks. A passenger sets the (or a) suitcase on belt 4. If the passenger has but one suitcase to be checked in, this single piece of luggage is then weighed and advanced to belt 6 for being otherwise processed such as affixing a tag for distination, flight number, etc. Thereafter, the suitcase is advanced further by the conveyor system. In case the passenger has one or two additional suitcases, the first one is advanced onto conveyor 6, etc., until all three are distributed on belts 4 and 6 as is actually shown in FIGS. 1 and 3. The progressing advance of the suitcases is preceded in each case by affixing the tags. With each advance, the total weight on belts 4 and 6 may be added and indicated by suitable weight indication equipment, for example, in or at the desk, metering the sum of the load on belts 4 and 6. Thus, until check-in is completed, there is always one suitcase on belt 4 or belt 6. As long as on belt 4 the passenger may still remove items from a suitcase in case the scale indicates excess weight. Processing is then completed while the suitcase is on belt 6. The weighing belt 6 is actually a buffer, which permits still weighing, particularly in case of plural pieces of luggage, but freeing belt 4 for immediate use and placement. The equipment should be designed to permit selectively separate indication of weight on belts 4 and 6, so that the suitcase on belt 4 may already pertain to the next passenger.

Each suitcase is separately transported away from the check-in counter; the luggage removal operates as follows. The first suitcase is moved onto conveyor belt 7, assumed to have flat, horizontal disposition. Belt 8, however, may already be tilted up about axis 71. Now, belt 7 is likewise tilted, so that the suitcase tips over and onto belt 8. It should be noted that the suitcase may have stood obliquely on belts 6 and 7, or may have been tilted somewhat about a vertical axis while moving from one belt to the next one. The tilting and tipping actually straightens the suitcase, to have its small bottom aligned (or realigned) with the direction of conveyor operation. When on belt 8, the suitcase lies flat on one side, but at the same orientation as to its long dimensions.

Now, belts 8 and 7 fold back into the horizontal, whereby the suitcase is moved onto belt 9. The carriage 91 has placed belt 9 into position as shown in FIG. 3. Upon receiving the suitcase, and advancing same in collinear direction, carriage 91 with belt 9 moves transversely for alignment with belt 10. As soon as the suitcase is on belt 10, the carriage 102 thereof retracts fast under belt 9 (arrow 16). Due to inertia, aided by the opposite direction of belt motion, the suitcase remains above the pallet 11 underneath and drops thereon. Pallet 11 is assumed to be resiliently cushioned to gently receive the suitcase and move same down (direction of arrow 17). Concurrently, or sthortly thereafter, carriage 102 returns (arrow 16') to its protracted disposition above shaft 21.

The arrangement 7, 8, 9, 10 operates quite fast, the conveyor belt speed thereof can be higher than of belts 4 and 6. Also, the folding up and down of belts 7 and 8, as well as movement of the several carriages, may be quite fast, so that the equipment 9 and 10 may actually service both counters of double counter 1, having juxtaposed baggage areas 2a and 2b. For this, carriage 91 can be moved selectively into alignment with belts 7 and 8, as well as into alingment with belts 7' and 8', as pertaining to baggage placement area 2b (having scale belts r', 6'). Reference numeral 93 denotes stops. The stop and go control for belts 7–8 and 7'–8' may be respectively dependent upon the disposition of carriage 91. Even in case of high speed check-in at the two counters, the carriage for reversing belt 9 moving back and forth will always be ready for the next suitcase from either counter.

Sometimes, suitcases are packed with a very low center of gravity, so that the tilting arrangement does not cause the suitcase to tip. This, however, is of no consequence, as it can be seen that a suitcase can move from belt 7 onto belt 9 in upright position and will drop from there onto belt 10. As the carriage for belt 10 retracts the case drops onto pallet 11, it may tip or be moved down upright. If a suitcase will not tip after the tilting arrangement has tried to tip it, the suitcase will certainly stand upright securely on its path further along towards the airplane. Proper loading of the pallet does not depend on a side down position of the suitcase.

It should be noted that suitable guard rails, such as 14 and 15, are provided to prevent a suitcase from leaving the prescribed path. The guard rails 14 and 15 pivot on an axis 145 and reverse position when pallet loading equipment receives a suitcase from the other counter. They are disposed above the conveyor plane of belt 9, so that they are not in the way of carriage 91. It can readily be seen that the suitcase tilting and tipping arrangement 7–8 may also be mounted on a laterally movable carriage, to service both check-in counters, i.e., to selctively receive luggage from belt 6 and from belt 6'.

The invention is not limited to the embodiments described above but all changes and modifications thereof not constituting departures from the spirit and scope of the invention are intended to be included.

We claim:

1. Check-in counter having a counter desk and a baggage receiving area next to the counter desk and having a front, there being a pallet conveyor facility behind the counter; a first conveyor belt disposed in the receiving area and having conveyor surface moving transverse to the front;

at least one other second conveyor belt disposed behind the first one to receive objects placed on the first belt for moving the object in the same direction, away from the front, at least one of said conveyor belts constructed as weighing scale;

first means disposed behind the second conveyor belt for tilting an object as received from the second belt on its side and transporting the object further; and second means disposed to receive the object from the first means for loading pallets of the pallet conveyor facility.

2. The combination as in claim 1, the first and second conveyor belts each constructed as independently operating scales, the first and second belts together accommodating plural suitcases.

3. The combination as in claim 2, the second means comprising a third conveyor belt, and a fourth conveyor belt having conveyor surfaces that move in parallel directions, the fourth belt mounted for moving between a position under the third belt and a position above a shaft, there being pallets for loading in the shaft.

4. The combination as in claim 3, the first means tipping the object out of alignment with a direction of transportation as provided by the first and second belts, the third conveyor belt movable as a whole, transverse, laterally to the direction being also the direction of movement of its conveyor surface.

5. The combination as in claim 2, the first means comprising a third conveyor belt behind the second belt, and a fourth conveyor belt next to and running parallel with the third belt, the third and fourth belts being tiltable about an axis parallel to and between the third and fourth belts.

6. Check-in counter as in claim 2, the first belt having length and width commensurate with length and heigh dimensions of a large standard suitcase.

7. The combination as in claim 1, the first belt having width under 2 feet.

8. The combination as in claim 1, there being a second counter desk and second baggage receiving area in mirror image disposition to the first counter desk and baggage receiving area, there being additional conveyor means disposed in the second baggage receiving area, the second means disposed for alternatingly receiving tilted objects from the first and second baggage receiving area and servicing the same pallet conveyor facility.

* * * * *